May 24, 1960     M. E. RUSSELL     2,937,509
CONTROL APPARATUS
Filed Nov. 19, 1956
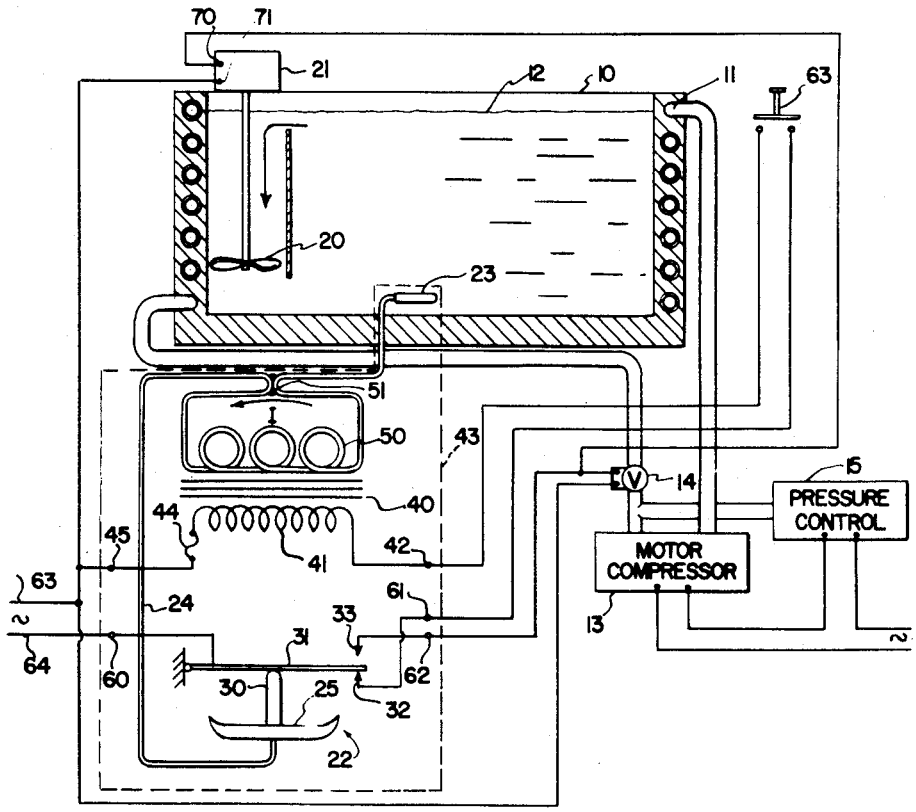
INVENTOR.
MARVIN E. RUSSELL
BY Robert S Craig
ATTORNEY United States Patent Office
2,937,509
Patented May 24, 1960

2,937,509

CONTROL APPARATUS

Marvin E. Russell, St. Louis Park, Minn., assignor to Minneapolis-Honeywell Regulator Company, Minneapolis, Minn., a corporation of Delaware Filed Nov. 19, 1956, Ser. No. 623,131

4 Claims. (Cl. 62—162)

The present invention is concerned with an improved method of overriding the primary control of a condition controlling device, in particular where a liquid filled tube connects the sensing bulb and controller, a portion of the tube is formed into a continuous loop and when a current is induced in the loop the liquid in the tube is heated to modify the effect of the sensing element on the controller.

In temperature controllers, specifically those for controlling the cooling apparatus for bulk milk tanks, there has been provided in the past a means for overriding the main control when desired. The control not only controls the cooling device but also an agitator or circulating pump in the tank which circulates the milk to bring it in contact with the cooling coils. It is often desired to start the agitator independently of the temperature control. Heretofore overriding circuits and timing devices have been used to initiate operation of the agitator for a predetermined period. With the case of a manual overriding switch it is necessary for the operator to hold the switch down for the period in which he wishes the agitator to operate or to manually open the switch after it is closed a period. Where a dependable timer is used to obtain a time delay the control becomes more expensive. There is a need for an inexpensive control device for turning on the agitator pump for a predetermined period which will not require continuous manual depression of an overriding button but will leave the operator free once the agitator pump is energized. In other words it is desired to have a control which can be manually turned on and automatically reset to normal operation without requiring mechanical parts which are subject to corrosion and failures.

The present invention is concerned with a temperature control device for controlling the refrigeration and agitator of a bulk milk tank and when it is desired to operate the agitator, even though the temperature of the tank is as desired, a button is depressed. Immediately the agitator will run for a predetermined period without requiring that the button or switch be maintained in a closed position. After the predetermined period has expired the control will automatically return to its normal operation to maintain the temperature of the bulk milk tank at the desired level. Specifically, the invention involves the use of a portion of a capillary tube connecting the sensing bulb and the controller as the secondary of a transformer. When the transformer primary is energized the current induced in the shorted portion of the capillary tube will heat the liquid therein and offset the control to initiate operation of the agitator pump until the capillary tube again returns to its normal temperature.

It is therefore an object of the present invention to provide an improved device for modifying the normal operation of a condition control device.

It is another object of the present invention to provide an improved temperature control system in which the control point of the system can be readjusted for a predetermined period.

These and other objects will become apparent upon a study of the specification and drawing of which a single figure is a schematic drawing of the temperature control device as shown when used to maintain the temperature of milk in a bulk milk tank cooling installation.

A bulk milk tank 10 is shown having a plurality of cooling coils 11 for cooling the milk in the tank. Coils 11 are supplied with refrigerant from a conventional motor compressor unit 13 through a valve 14. The pressure of refrigerant in the system is controlled by the motor compressor unit which in turn is controlled by a conventional pressure control 15 which senses the pressure developed by a motor compressor. When the pressure reaches some predetermined value the motor compressor is shut down. The supply of refrigerant to the coils is primarily controlled by the valve 14 and whenever the valve is opened the pressure in the line drops and pressure control 15 initiates operation of the compressor. The milk is circulated in the tank by an agitator pump 20 driven by a motor 21.

A conventional controller 22 is connected to a temperature responsive bulb 23 by a metal capillary tube 24. The bulb, tube and controller are filled with a liquid so that upon an increase in temperature of bulb 23 the liquid pressure increases to move a diaphragm 25 of the controller upward. The diaphragm has a pin 30 for operating a movable arm 31 of a snap switch. Switch arm 31 normally engages contact 32 when the temperature of the milk as sensed by bulb 23 is below a predetermined value. Upon the temperature of the milk increasing switch arm 31 snaps upward to engage contact 33. The apparatus explained might be a conventional temperature controller having a remote bulb as the controller per se is not a part of this invention. A transformer 40 has a primary winding 41. One extremity of the primary is connected to terminal 42 of the control apparatus 43 and the other extremity of the transformer is connected through a fuse 44 to a terminal 45. The secondary 50 of the transformer comprises a portion of the capillary tube 24 of controller 22 which is wound to form a shorted secondary. Portions of the tube are electrically connected in some conventional manner such as at the brazed connection 51 so that when the primary 41 is energized a current I is induced in the shorted secondary. The fluid in the tube 24 of the looped portion is then heated by the $I^2R$ loss of the shorted secondary. As the fluid expands the control point of controller 22 is modified.

Switch arm 31 is electrically connected to terminal 60 of the panel. Contact 32 and contact 33 are connected to terminal 61 and 62, respectively. A remote manual switch 63 is connected between terminals 42 and 61. Valve 14 having a conventional energization circuit is connected between terminal 62 and one side 63 of a source of power. The other side 64 of the power source is connected to terminal 60. Terminal 70 of motor 21 is connected to terminal 62 and terminal 71 is connected to power terminal 63. Terminal 45 is connected to power terminal 63.

*Operation*

Normally control panel 43 which has bulb 23 sensing the temperature of the milk in the tank controls the operation of agitating pump motor 21 and the supply of cooling medium to the coils to maintain the temperature of the milk at some predetermined level. When milk reaches a selected low temperature the system is shut down. There is a tendency for milk in the tank to settle and the lighter cream comes to the top. When an inspector or person desiring to take a sample of the milk from the tank visits the particular installation of concern it is desired that the agitating pump be running some predetermined period before a sample is taken so that the contents of the tank are thoroughly mixed up. If the system is not then in operation, the operator depresses button 63 and this causes energization of the primary windings of transformer 40 through the circuit as traced from power terminal 64, terminal 60, switch arm 31, contact 32, terminal 61, switch 63, terminal 42, primary 41, fuse 44, terminal 45 and back to the power source terminal 63. The secondary of the transformer which in this case is the shorted portion of the capillary tube 24 has a current induced therein and this current immediately heats up the tube and the liquid therein. Upon heating of the liquid in the closed liquid filled system, controller 22 causes upward movement of pin 30 and switch arm 31 snaps upward. Upon switch arm 31 engaging contact 33 the agitator pump motor 21 is energized. The primary circuit is immediately broken when arm 31 moves away from contact 32, thus preventing the current I in the secondary 50 of the transformer from heating the transformer so hot to cause a destruction of the unit. Thus manual operation is initiated by switch 63 and automatic reset to normal operation is obtained when the looped portion of tube 24 cools down. When button 63 is held down while the pump and cooling device are operating the control point of the system will not be disturbed. As the transformer 40 is only energized momentarily, the temperature of the shorted portion of tube 24 can be controlled within limits so that the time in which agitating pump motor 21 will run after the depression of button 63 will not be too long.

It is thus seen with such an apparatus the control point of the system can be modified practically instantaneously to initiate operation of pump motor 21 and once the motor is energized button 63 need not be held in a depressed position. By means of the shorted secondary made up of a portion of tube 24 an inexpensive and yet reliable control is provided.

While one specific use of the present invention is shown as applicable to bulk milk tank controllers it is obvious that there are other applications for my invention, thus it is intended that the invention only be limited by the appended claims of which I claim:

1. In a bulk milk tank temperature control system, a motor driven means for agitating the milk in the tank, cooling means for cooling said milk, a controller having a normally closed switch and a normally open switch, said controller having an operator with a sensing element responsive to the temperature of the milk, said operator having a tube comprising part of a liquid filled system, a transformer having a primary winding and a shorted secondary winding, said secondary winding comprising a portion of said tube, a source of power, a manually operated switch, connection means including said manually operated switch and said normally closed switch for connecting said primary winding to said source of power, and connection means including said normally open switch for connecting said motor driven means and said cooling means to said source of power, thus upon closing said manual switch said tube of said secondary is heated to cause said operator to close said normally open switch and open said normally closed switch of said controller thereby energizing said motor driven means even though the temperature of said sensing element is not high enough to operate said controller.

2. In a control system, a device to be energized, a controller having a normally closed switch and a normally open switch, said controller having an operator with a sensing element responsive to a condition, said operator having a tube comprising part of a liquid filled system, a transformer having a primary winding and a shorted secondary winding, said secondary winding comprising a portion of said tube, a source of power, a manually operated switch, connection means including said manually operated switch and said normally closed switch for connecting said primary winding to said source of power, and connection means including said normally open switch for connecting said device to said source of power, thus upon closing said manual switch said tube of said secondary is heated to cause said operator to close said normally open switch and open said normally closed switch of said controller thereby energizing said device even though said condition is not of a value to operate said controller.

3. In a temperature control device, switch means, an operator adapted to control said switch means, a sensing element, means including a tube for connecting said sensing element to said operator in a fluid filled system, said switch means being operated when the temperature of said element rises above a predetermined level to expand said liquid, and a transformer having a primary winding connected to a source of power and a shorted secondary winding, said secondary winding being a portion of said tube thus upon energizing said primary winding said tube and thus the fluid therein is heated to expand thereby operating said switch even though said temperature is below said predetermined level.

4. In a temperature control device, a controller, a sensing bulb, a tube connecting said bulb to said controller to make up a fluid filled system so that upon said fluid expanding in said system as the temperature of said bulb increases said controller will operate when said temperature is above a predetermined temperature, and means for selectively inducing a current in a portion of said tube so that the heat developed therefrom will increase the temperature of the fluid to cause said controller to operate when said bulb temperature is below said predetermined temperature.

References Cited in the file of this patent
UNITED STATES PATENTS

| | | |
|---|---|---|
| 1,547,632 | Wensley | July 28, 1925 |
| 2,433,493 | Turner | Dec. 30, 1947 |
| 2,488,435 | Ritter | Nov. 15, 1949 |
| 2,593,214 | Stroup | Apr. 15, 1952 |
| 2,785,545 | Pusey | Mar. 19, 1957 |